(12) United States Patent
Moore et al.

(10) Patent No.: US 10,314,327 B2
(45) Date of Patent: Jun. 11, 2019

(54) AVOCADO DE-SEEDER AND DE-SKINNER AND METHOD

(71) Applicant: Moore & Champlin Holdings, LLC, Imperial Beach, CA (US)

(72) Inventors: Richard Moore, Seligman, AZ (US); Gary Champlin, Laguna Hills, CA (US)

(73) Assignee: MOORE & CHAMPLIN HOLDINGS, LLC, Imperial Beach, CA (US)

( * ) Notice: Subject to any disclaimer, the term of this patent is extended or adjusted under 35 U.S.C. 154(b) by 0 days.

(21) Appl. No.: 15/505,910

(22) PCT Filed: Apr. 20, 2015

(86) PCT No.: PCT/US2015/026718
§ 371 (c)(1),
(2) Date: Feb. 22, 2017

(87) PCT Pub. No.: WO2015/164281
PCT Pub. Date: Oct. 29, 2015

(65) Prior Publication Data
US 2017/0332692 A1    Nov. 23, 2017

(51) Int. Cl.
A23N 7/08    (2006.01)

(52) U.S. Cl.
CPC .................... A23N 7/08 (2013.01)

(58) Field of Classification Search
CPC ... A23N 7/02; A23N 7/08; A23N 1/02; A23N 7/00; A23N 7/10; A23N 12/04; A23N 7/005; A23N 15/06; A23N 3/04; A23N 4/04; A23N 4/22
See application file for complete search history.

(56) References Cited

U.S. PATENT DOCUMENTS 4,600,593 A  *  7/1986  Swisher .................... A23L 5/11
                                                         426/438

* cited by examiner

Primary Examiner — Hong T Yoo
(74) Attorney, Agent, or Firm — Steins & Associates, P.C.

(57) ABSTRACT

An Avocado De-seeder and De-skinner and Method is disclosed. The cutting, deseeding and pulping sequences is conducted by three separate stations along a conveyor system. At a first station, the incoming avocados (including the seeds) are cut into two halves. At a second station, the seed-halves are plucked cleanly from the avocado half without damaging the pulp. At a third station, the skin is removed cleanly from the pulp and discarded. In order to insure that the skin is easily removed and that the pulp is left undamaged, the skin side of the (seeded) avocado halves is heated enough to release the skin, but not so much as to damage the pulp. This heating step is conducted as the de-seeded avocado halves are being conveyed from the de-seeder to the de-skinner.

18 Claims, 14 Drawing Sheets

AVOCADO DE-SEEDER AND DE-SKINNER AND METHOD

This application is filed within one year of, and claims priority to Provisional Application Ser. No. 61/981,835, filed Apr. 20, 2014.

This application is a continuation-in-part of application Ser. No. 13/443,802, filed Apr. 10, 2012 (the "parent application"), now pending.

BACKGROUND OF THE INVENTION

1. Field of the Invention

This invention relates generally to food processing equipment and, more specifically, to an Avocado De-seeder and De-skinner and Method.

2. Description of Related Art

Avocados have become more and more popular for their versatility and arguable health-related benefits. They come in various varieties and sizes. For example, West Indian avocados produce enormous, smooth round, glossy green fruits that are low in oil and can weigh up to two pounds. Guatemalan varieties produce medium ovoid or pear-shaped, pebbled green fruits that turn blackish-green when ripe. The fruit or pulp of Mexican versions of avocado tends to be smaller (six to ten ounces) with skins that turn glossy green or black when ripe.

The pulp of avocados is deep green near the skin, becoming yellowish nearer the single large, inedible ovoid seed. The pulp is hard when harvested but softens to a buttery texture as the avocado ripens. Avocados are high in monosaturates and the oil content is second only to olives among fruits in its health benefits. Clinical feeding studies in humans have shown that avocado oil can actually reduce blood cholesterol. To effectively obtain the pulp of an avocado, the avocado must be de-skinned and the seed must be removed.

Because of their existing and ever-growing popularity, there continues to be a need to effectively and efficiently remove the pulp from an avocado for processing regardless of the size or type of avocado being processed. The prior art has numerous de-skinning or peeling machines and pulp or fruit removal machines which have been cited in the parent application. Most are extremely complex, somewhat cumbersome, and costly to manufacture and maintain.

The instant inventor previously solved many of the problems associated with pulp removal and skin/seed disposal in his prior issued patents and pending patent applications (U.S. Pat. No. 7,444,930 and application Ser. Nos. 11/845,184, 11/845,233, 12/423,356, and 12/628,806); all of which are hereby incorporated by reference.

This current avocado pulper, however, is an even more vast improvement to all prior-art devices. It will de-seed, de-pulp, and de-skin an avocado with little human intervention; and, in the same amount of time, will produce more pulp than with any prior-art device and less waste of usable product will result. Unwanted items [skin and seed] will not be co-mingled with the pulp. Moreover, with the relative "flexibility" of the grip belts and the de-seeder, a hard avocado pulp or a stray seed will not jam the avocado pulper. Furthermore, disassembly of the device for cleaning and maintenance has been greatly improved. All these advances and at a speed of production unsurpassed by any other device, and the resulting pulp is "chunkier" than available from any prior machine.

Prior to the development of the instant device, fruits (other than avocados) and vegetables are more easily de-skinned by the heating of these foods. Such heating typically does not adversely affect the flavor, texture, or appearance of most such foods. Processing avocados by first heating for the purpose of de-skinning them, however, has not previously been found to be nutritionally sound. Avocados are a fruit which is extremely sensitive to heat. This was thought to be so because its green (chlorophyll) layer of its pulp as it lies immediately below the skin and, consequently, is subject to greatest heat exposure and nutritional loss and flavor loss.

The foregoing has outlined some of the more pertinent objects of the avocado pulper of this disclosure. These objects should be construed to be merely illustrative of some of the more prominent features and applications of the avocado pulper of this disclosure. Many other beneficial results can be attained by applying the disclosed avocado pulper of this disclosure in a different manner or by modifying the avocado pulper of this disclosure within the scope of the disclosure. Accordingly, other objects and a fuller understanding of the avocado pulper of this disclosure may be had by referring to the summary of the avocado pulper of this disclosure and the detailed description of the preferred embodiment in addition to the scope of the avocado pulper of this disclosure defined by the claims taken in conjunction with the accompanying drawings.

SUMMARY OF THE INVENTION

In light of the aforementioned problems associated with the prior devices and methods, it is an object of the present invention to provide an Avocado De-seeder and De-skinner and Method. The cutting, deseeding and pulping sequences should be conducted by three separate stations along a conveyor system. At a first station, the incoming avocados should be cut in two halves, including the seed. At a second station, the seed-halves should be plucked cleanly from the avocado half without damaging the pulp. At a third station, the skin should be removed cleanly from the pulp and discarded. In order to insure that the skin is easily removed and that the pulp is left undamaged, the skin side of the (seeded) avocado halves should be heated enough to release the skin, but not so much as to damage the pulp. The heating step may be conducted by spraying hot water onto the halves as they are passed by conveyor from the deseeder to the deskinner, or other heating approaches may be used.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Avocado De-seeder and De-skinner and Method.

Figure 1:
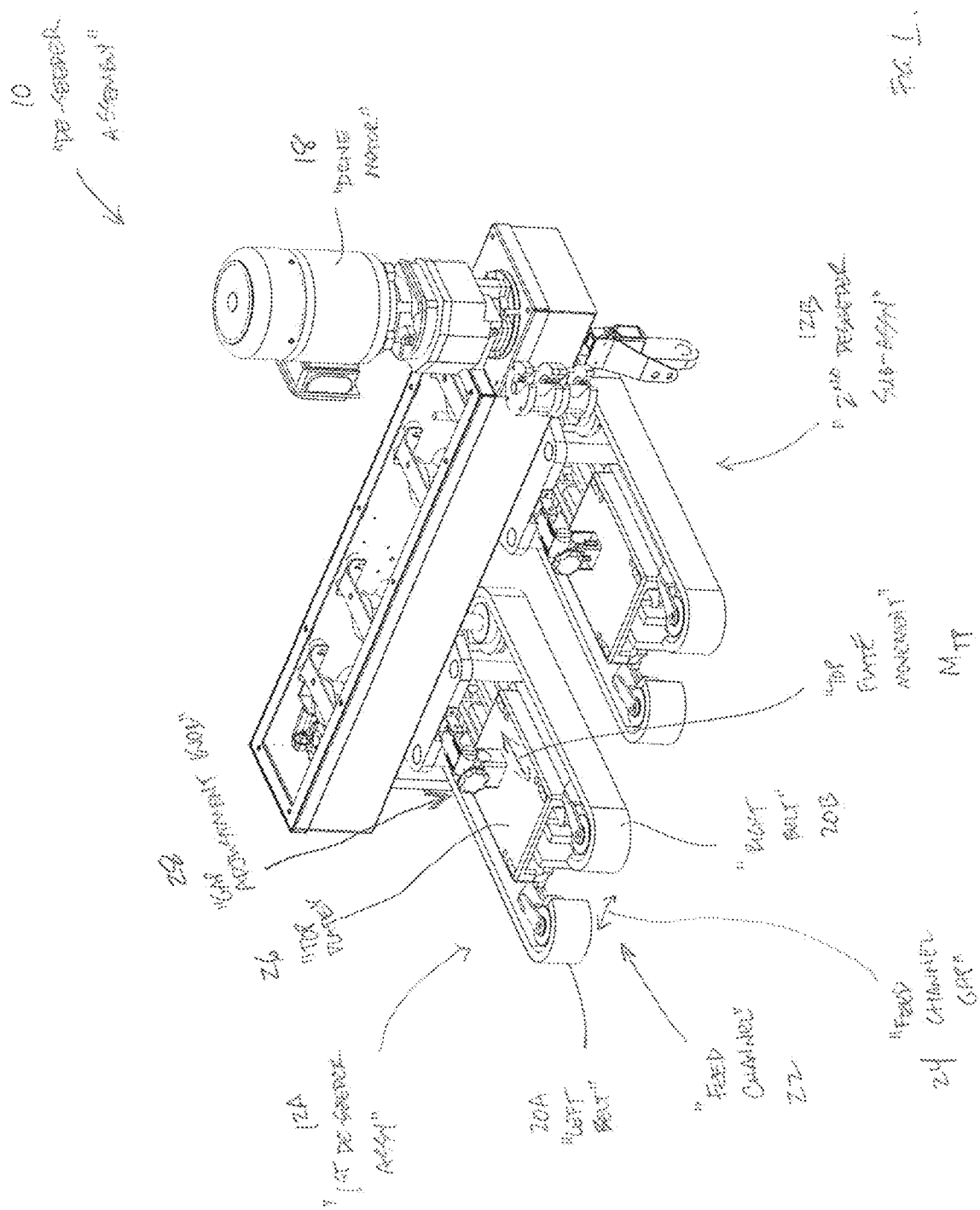
FIG. 1 is a perspective view of a preferred embodiment of the de-seeder assembly of the present invention.

The present invention can best be understood by initial consideration of FIG. 1.[1] FIG. 1 is a perspective view of a preferred embodiment of the de-seeder assembly 10 of the present invention. This version of the de-seeder 10 is somewhat similar in theory to the device of the parent patent, but with three important distinctions. First, this is a stand-alone de-seeder mechanism that only removes the seed-halves, but does not remove the skin from the pulp. Second, the feed channel width adjustment mechanism has been simplified so that it can be maintained more easily than the prior system. Finally, the de-seeder 10 adjusted for width (to accommodate a different size of fruit/seed) while the machine continues to run (by simply turning a knob).

[1] As used throughout this disclosure, element numbers enclosed in square brackets [ ] indicates that the referenced element is not shown in the instant drawing figure, but rather is displayed elsewhere in another drawing figure.

The typical de-seeder 10 is made up of a pair of side-by-side de-seeder subassemblies 12A, 12B, which are essentially identical. As should be apparent, a single drive motor 18 drives the belts on both subassemblies 12A, 12B, thereby allowing the de-seeder 10 to process two streams of avocado halves simultaneously (i.e. both left and right halves after being cut by the avocado cutter, such as that of application Ser. No. 13/301,054).

Figure 2:
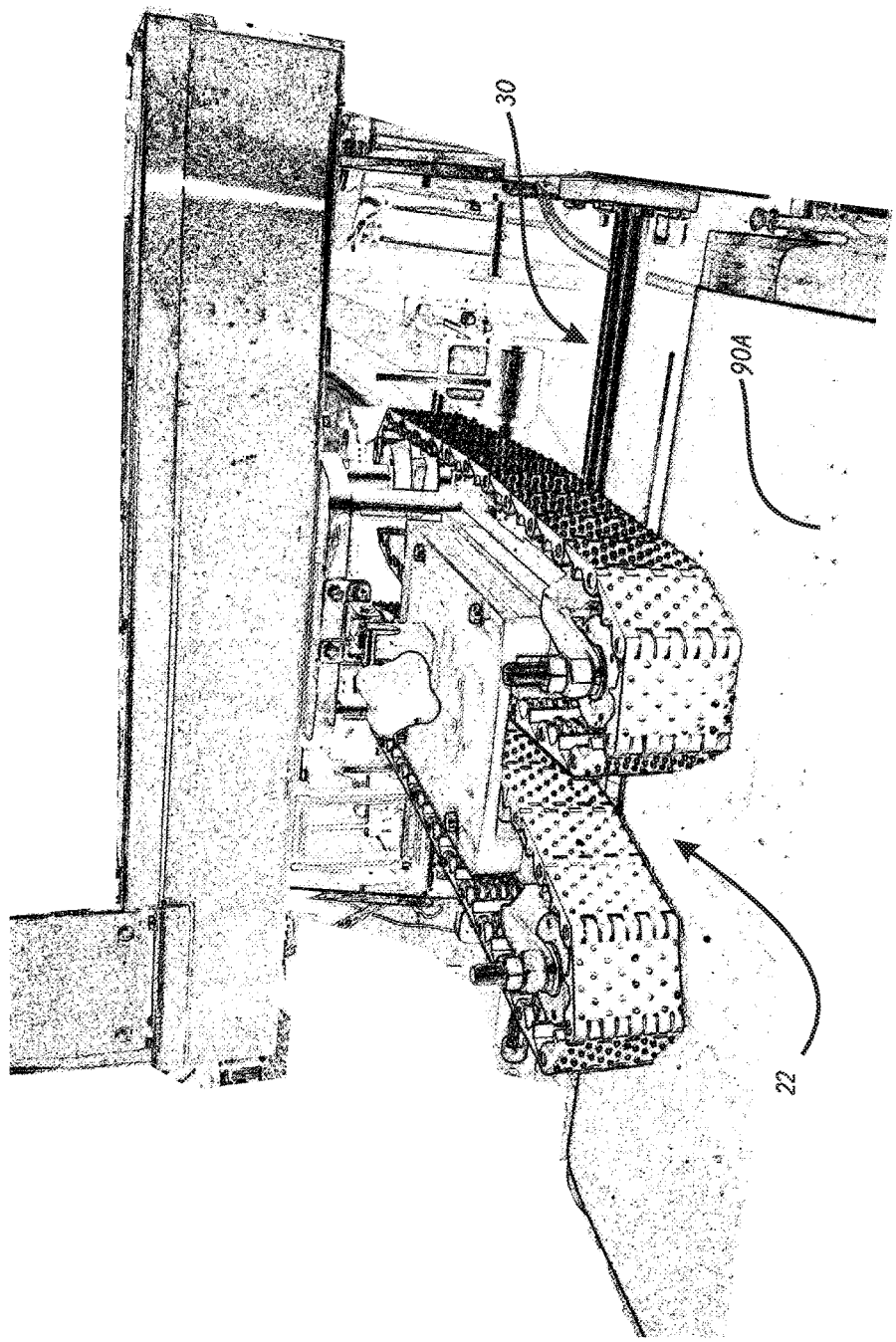
FIG. 2 is a perspective view of one de-seeder subassembly of the device of FIG. 1.
Figure 3:
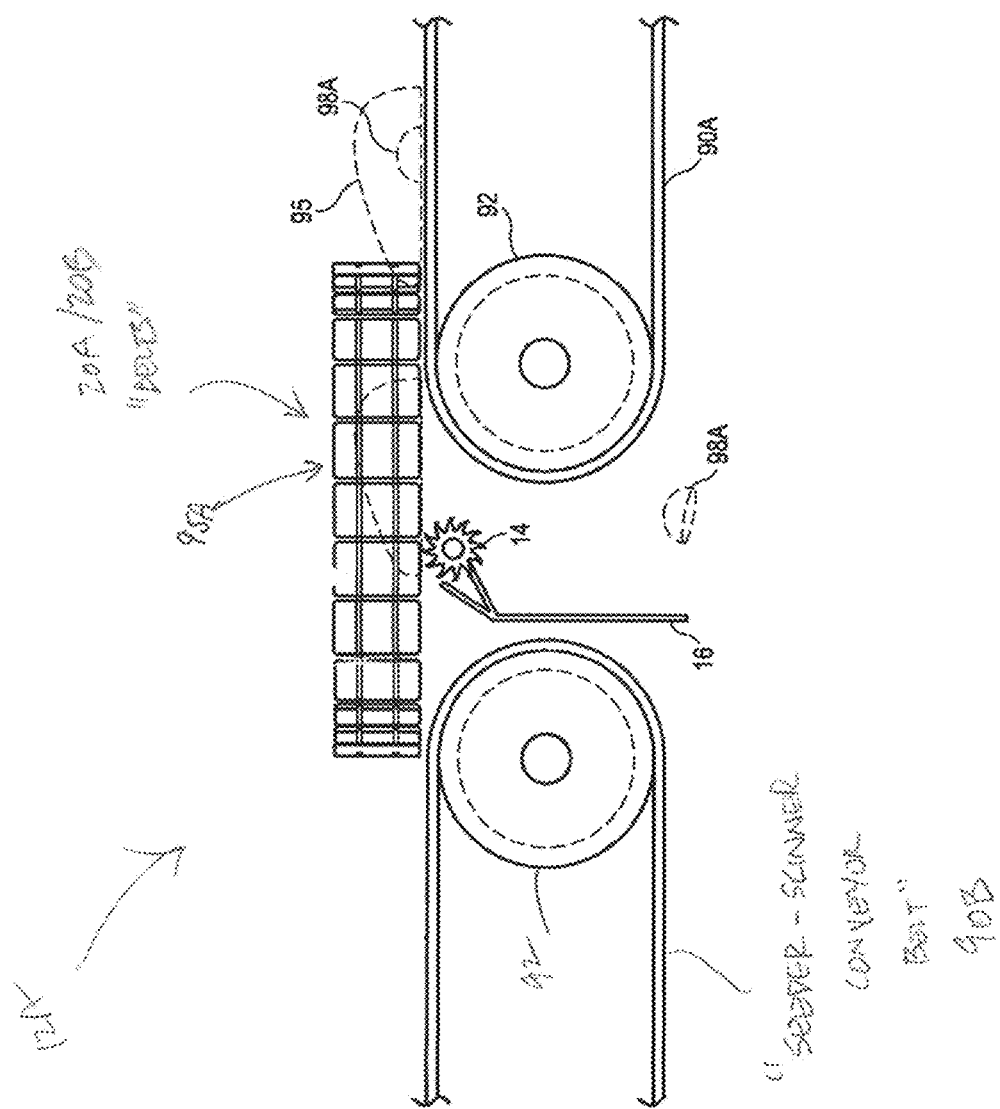
FIG. 3 is a schematic side view of the left de-seeder subassembly of the device of FIG. 1.

Using the first de-seeder subassembly 12A as an example, there are a pair of rotating belts 20A, 20B. A feed channel 22 is defined between the two belts 20A, 20B. Incoming avocado halves pass through the channel 22 from front (left in this view) to back as the seed is removed (as will be discussed in connection with FIG. 3). In order to accommodate varying sizes of avocado halves, it is necessary that the operators be capable of adjusting the width of the feed channel gap 24. The gap 24 can be made wider or narrower by adjusting the position of top plate 26 in the direction shown and labeled as $M_{TP}$. The top plate 26 is caused to move by turning the gap adjustment knob 28, which draws the top plate 26 closer to, or pushes it farther away from the drive wheels. FIGS. 2 and 3 provide additional detail about the de-seeding mechanism.

FIG. 2 is a perspective view of one de-seeder subassembly 12A/12B of the device of FIG. 1. As shown, the cutter-seeder conveyor belt 90A delivers avocado halves from the cutter to the feed channel 22 of the de-seeder subassembly 12A/12B. A spiked wheel [14] is caused to rotate by a de-seeder shaft 30 that is driven by the drive motor [18].

FIG. 3 is a schematic side view of the left de-seeder subassembly 20A of the device of FIG. 1. As the avocado halves 95 (containing the half-seed 98A) are delivered to the de-seeder subassembly 12A by the cutter-seeder conveyor belt 90A (running on rollers 92), the pair of belts 20A/20B grasp and hold the avocado 95 while passing it over the top of the spiked wheel 14. The spiked wheel 14 is allowed to rotate on its mounting stand 16, and is driven to rotate in the direction opposite to the travel of the avocado half by the de-seeder shaft [30].

Figure 4:
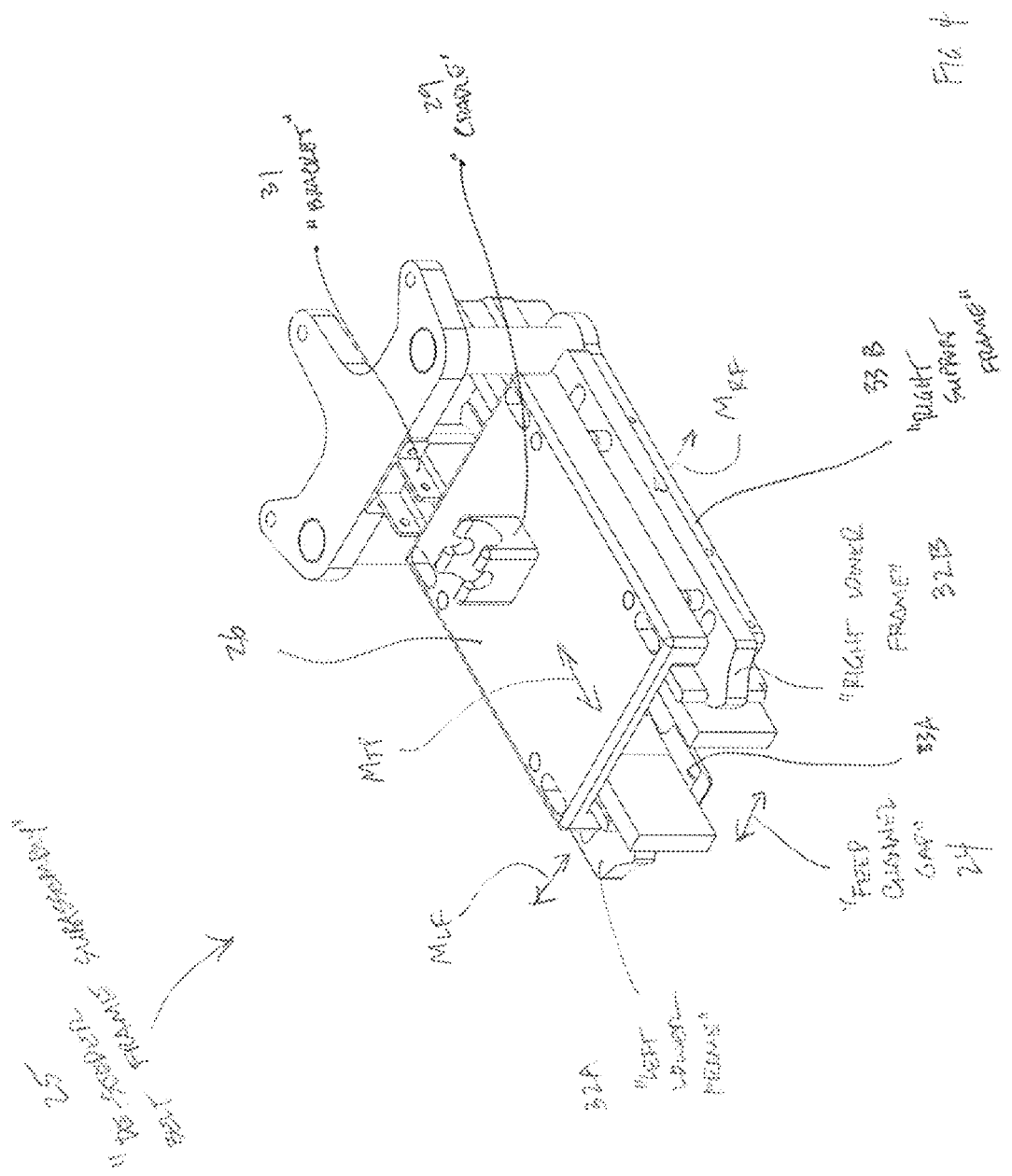
FIG. 4 is a perspective view of the belt frame assembly of the device of FIG. 1.

Once the seed half 98A is plucked from the avocado meat, the seeded avocado half 95A is delivered by the belts 20A/20B to the seeder-skinner conveyor belt 90B. FIG. 4 continues to depict the belt gap adjustment mechanism.

FIG. 4 is a perspective view of the belt frame assembly 25 of the device of FIG. 1. Right and left lower frames 32A, 32B, respectively, support and guide each belt [20A, 20B] as they rotate. The left lower frame 32A is driven to move in direction $M_{LF}$, and the right lower frame 32B is driven to simultaneously move in direction $M_{RF}$ whenever the top plate 26 is moved in direction $M_{TP}$. The top plate 26 is moved in direction $M_{TP}$ by the gap adjustment knob [28]. The knob [28] engages a threaded bolt extending from bracket 31 at a peg having a cross-axis threaded bore formed through it. The peg is retained within the recessed center of the cradle 29 extending upwardly from the top plate 26.

Figure 5:
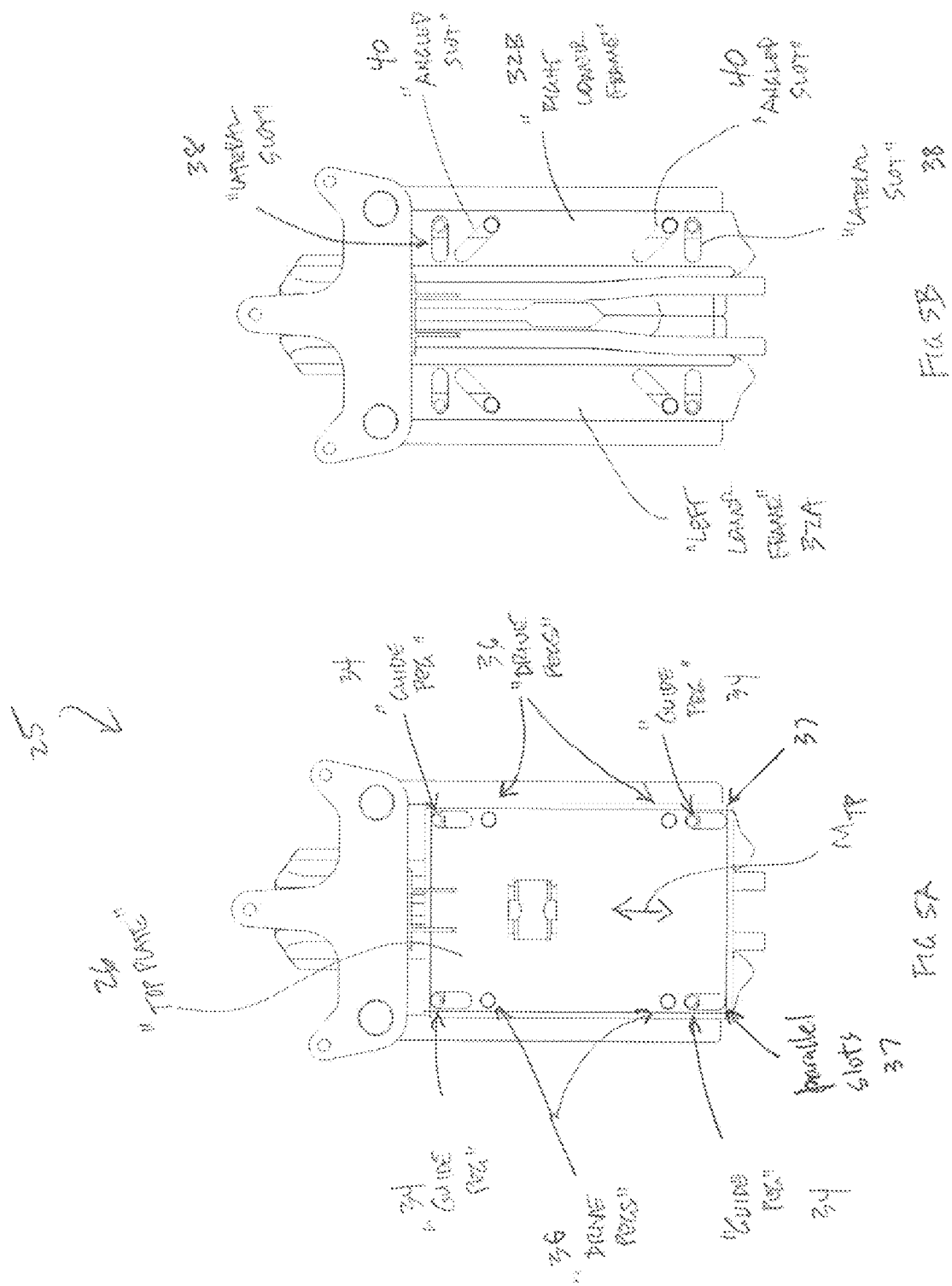
FIGS. 5A and 5B are top views of the belt frame assembly of FIG. 4.

The left and right lower frames 32A, 32B are supported by, and allowed to move relative to, left and right support frames 33A, 33B. FIGS. 5A and 5B continue to depict the operation of the adjustment of the feed channel gap 24.

FIGS. 5A and 5B are top views of the belt frame assembly 25 of FIG. 4. FIG. 5B is the same as FIG. 5A, except that the top plate 26 has been removed. There are a plurality of guide pegs 34 extending upwardly from the support frames [33A, 33B], and through parallel slots 37 to guide the top plate 26 as it moves in direction MIT.

There are also a plurality of drive pegs 36 extending down from the bottom surface of the top plate 26, and through the angled slots 40 formed in the left and right lower frames 32A, 32B. The guide pegs 34 pass through lateral slots 38 prior to reaching the parallel slots 37. As the top plate 26 moves up and down (in this view), the drive pegs 36 will engage the angled slots 40 to cause the lower frames 32A, 32B to move in and out, with the movement of the lower frames 32A, 32B being guided by the lateral slots 38 riding along the guide pegs 34. The result movement is depicted in FIGS. 6A and 6B.

Figure 6:
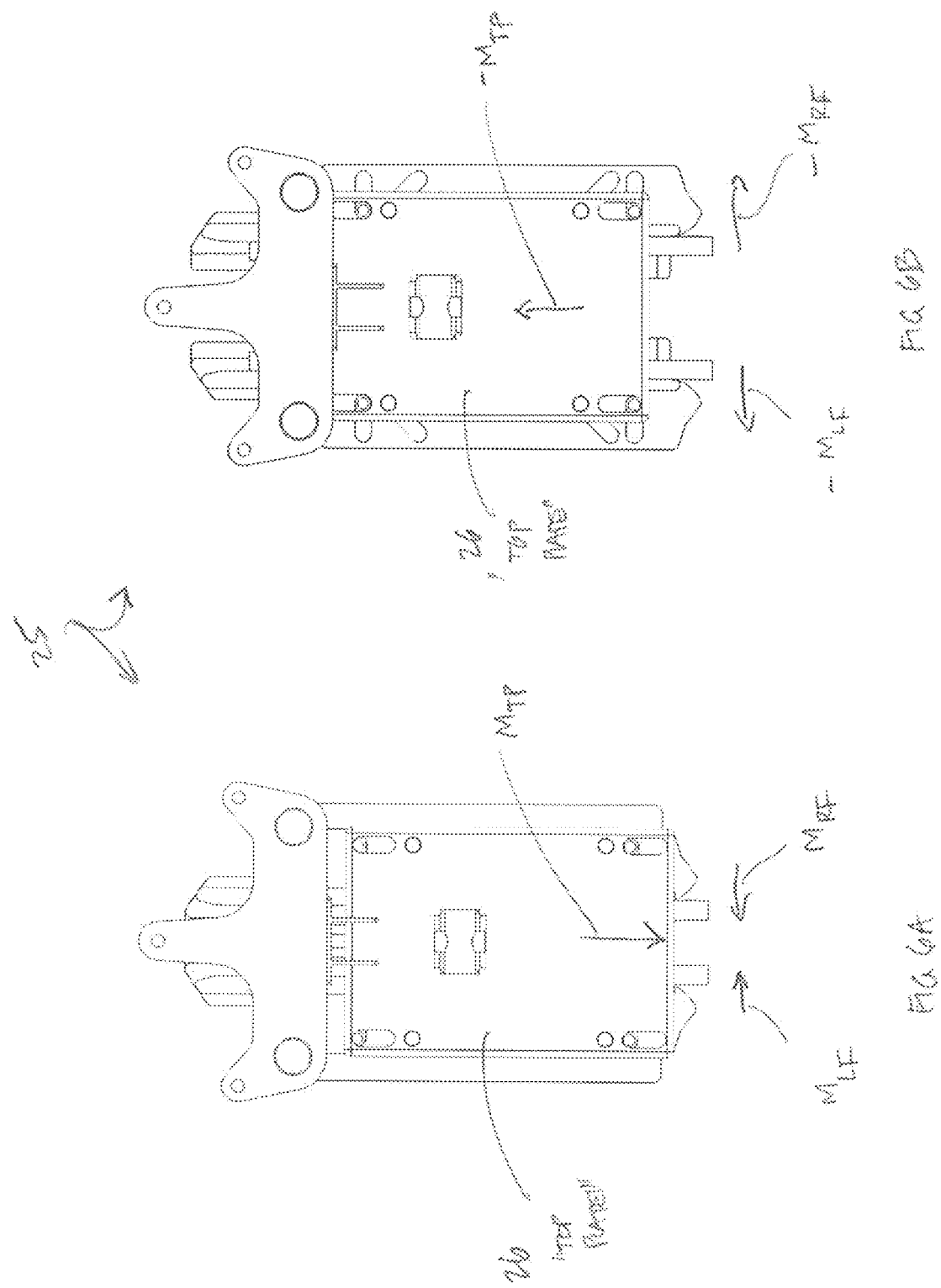
FIGS. 6A and 6B are top views of the belt frame assembly of FIGS. 4, 5A and 5B, showing two different feed gap conditions.

FIGS. 6A and 6B are top views of the belt frame assembly 25 of FIGS. 4, 5A and 5B, showing two different feed gap conditions. In FIG. 6A, the top plate 25 is at the extent of its travel in the "down" direction (as viewed here). The lower frames 32A, 32B have been correspondingly moved towards one another so that they are as close as they can get, and the feed channel gap [24] is at its narrowest. In FIG. 6B, the top plate 25 is at the extent of its travel in the "up" direction, which has caused the lower frames 32A, 32B to travel to their maximum distance apart, so that the feed channel gap

[24] is at its widest. Having discussed the de-seeder completely, we will now examine the subsequent mechanisms and steps of the system and method of the present invention.

Figure 7:
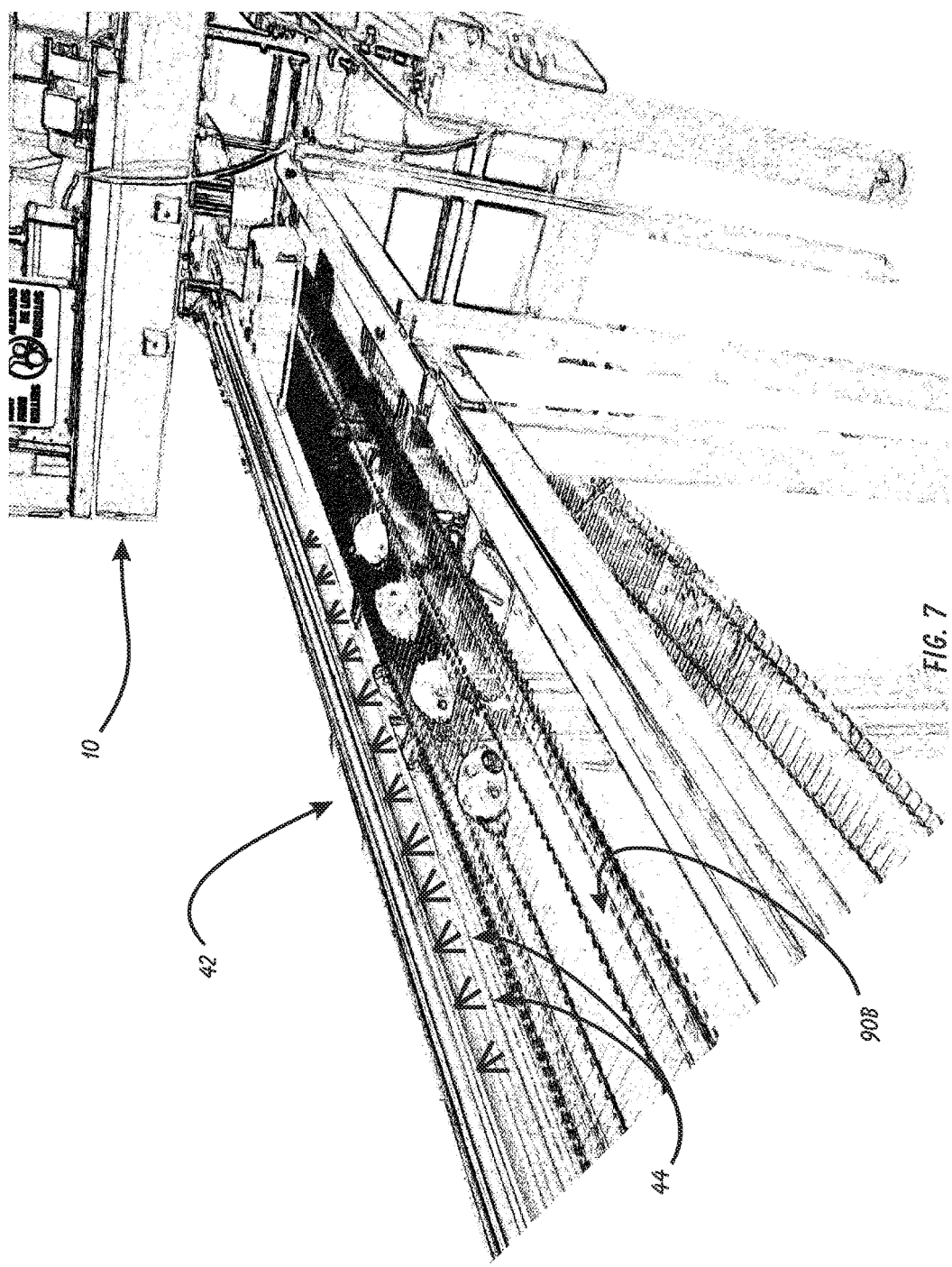
FIG. 7 is a perspective view of the seeder-skinner conveyor belt and heating system.

FIG. 7 is a perspective view of the seeder-skinner conveyor belt 90B and preferred heating system of the present invention. As the cut, de-seeded avocado halves travel long the seeder-skinner conveyor belt 90B with their skin-side up (pulp-side down), they will pass under an overhead hot water dispensing manifold 42 that extends over the top in spaced relation to the belt 90B. Hot water spray 44 (could actually be steam or heated oil spray) will be emitted from the manifold 42, so that it coats the avocados as they pass by. While other heating methods have been tested and are suitable for the instant invention, it has been found that using water that is just below its boiling point to heat the avocado skins is the best method. However, in certain circumstances, other conventional heating methods could be preferred, such as flame heat, radiant heat, and others. Using two hundred (200) degree fahrenheit water, with the fruit travelling at approximately sixty (60) feet per minute, has been found to heat the skin of the avocado to a temperature of approximately one hundred and six (106) degrees fahrenheit, which is actually a lower temperature than the skins reach from sitting in the sun (i.e. when on the trees). This small bit of heating has been found to not damage the pulp, but does make the skin very loose and easy to remove.

Figure 8:
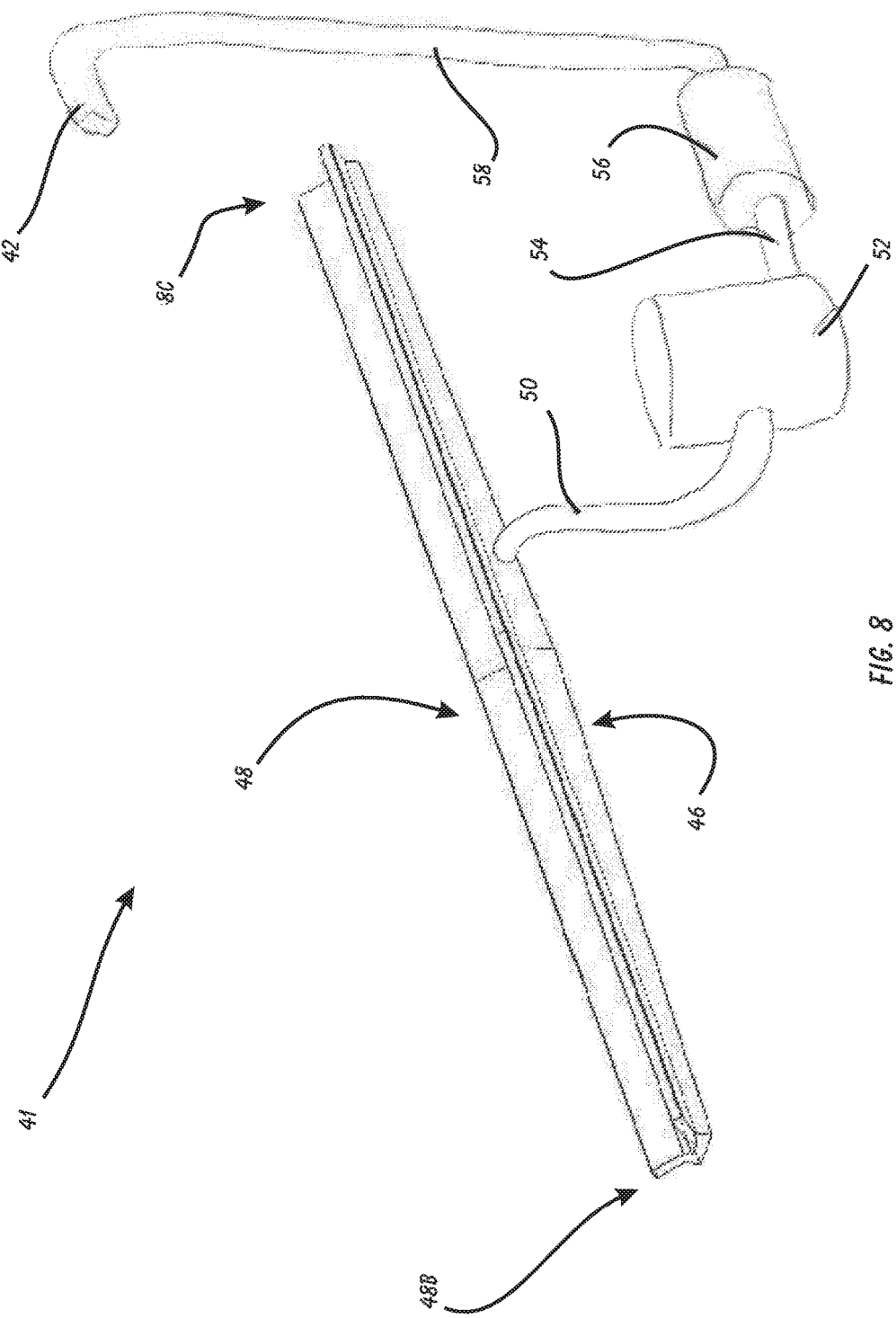
FIG. 8 is a perspective view of the plumbing system of a preferred avocado skin heating system using hot water.
Figure 9:
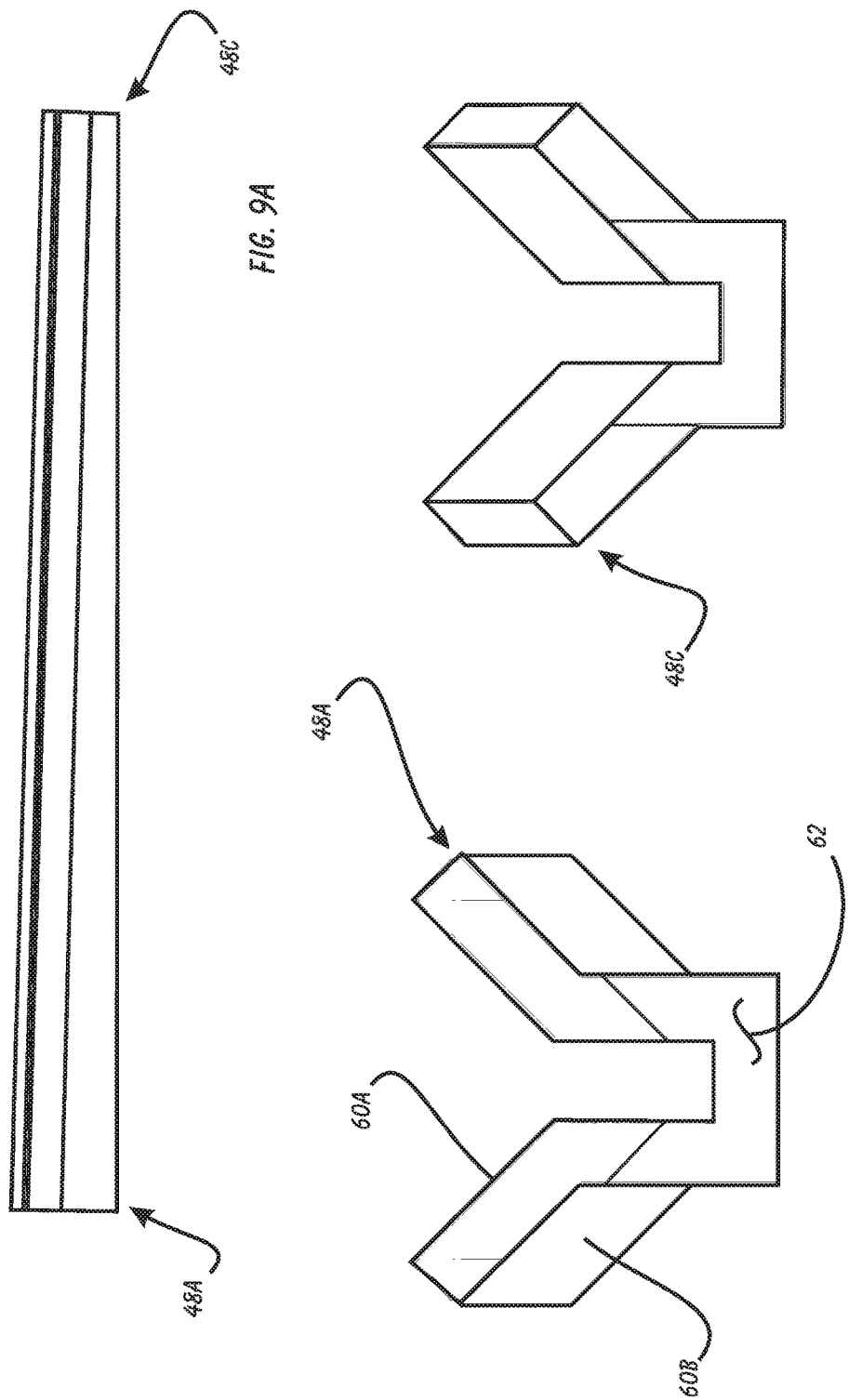
FIGS. 9A, 9B and 9C depict the insulated trough of the system of FIG. 8.

While the cutter-seeder conveyor belt [90A] is preferably made from a solid, hygienic, flexible material (such as PTFE or the like), the seeder-skinner conveyor belt 90B is preferably made from perforated or otherwise open weave stainless steel. This is to permit the water spray 44 to drain through the belt 90B and into a trough (see FIGS. 8 and 9). The trough runs along the length of the belt 90B, directly below the hot water dispensing manifold 42, so that all of the water spray and dripping water is captured. FIG. 8 depicts the arrangement of the hot water system.

FIG. 8 is a perspective view of the plumbing system of a preferred avocado skin heating system 41 using hot water. As the water sprays from the manifold 42 and runs off of the avocados and the belt [90B], it will be captured by the insulated trough 46. As can be seen, the trough 46 has a sloped bottom that starts at the two ends 48B, 48C, and terminates at its lowest point at the center 48A. This insures that all of the water is captured by the drain and return pipe 50, which is located at the center 48A of the trough 46. In other embodiments, the drain and return pipe 50 could be located away from the center 48A.

Water from the return pipe 50 is typically gravity fed into an insulated reservoir, where is held until the system is switched on. A heating element may be inside the reservoir 52, or it may be located somewhere along the rest of the piping system. Water from the reservoir 52 passes to the pump 56 via intake pipe 54, when the pump 56 is energized. The pump 56 then drives water up the supply pipe 58 and out to the hot water dispensing manifold, where it is sprayed [44] onto the avocado halves. FIGS. 9A-9C provide additional detail regarding the trough 46.

FIGS. 9A, 9B and 9C depict the insulated trough 46 of the system of FIG. 8. As seen from the side in FIG. 9A, the bottom of the trough 46 slopes from the end 48C to the center 48A. The trough 46 comprises an inner shell 60A and an outer shell 60B, which are separate from one another to form an interstitial space 62. When assembled, it is preferred that some type of insulating material be injected or otherwise placed within the interstitial space 62, in order to retain as much of the latent heat in the avocado heating water as possible. As the avocados reach the end of the seeder-skinner conveyor [90B], they will reach the de-skinner as depicted in FIG. 10.

Figure 10:
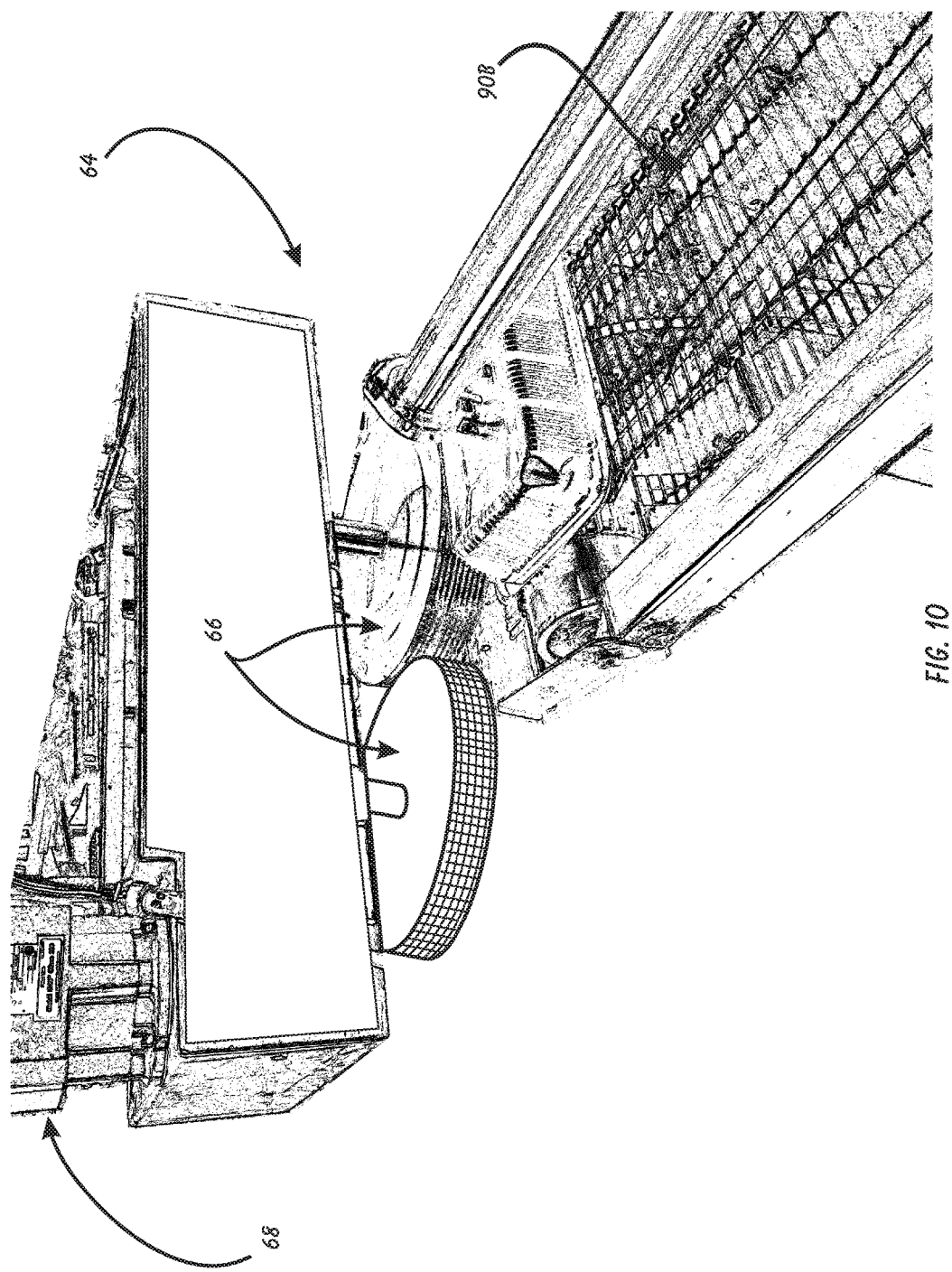
FIG. 10 is a perspective view of a preferred de-skinner of the present invention.
Figure 11:
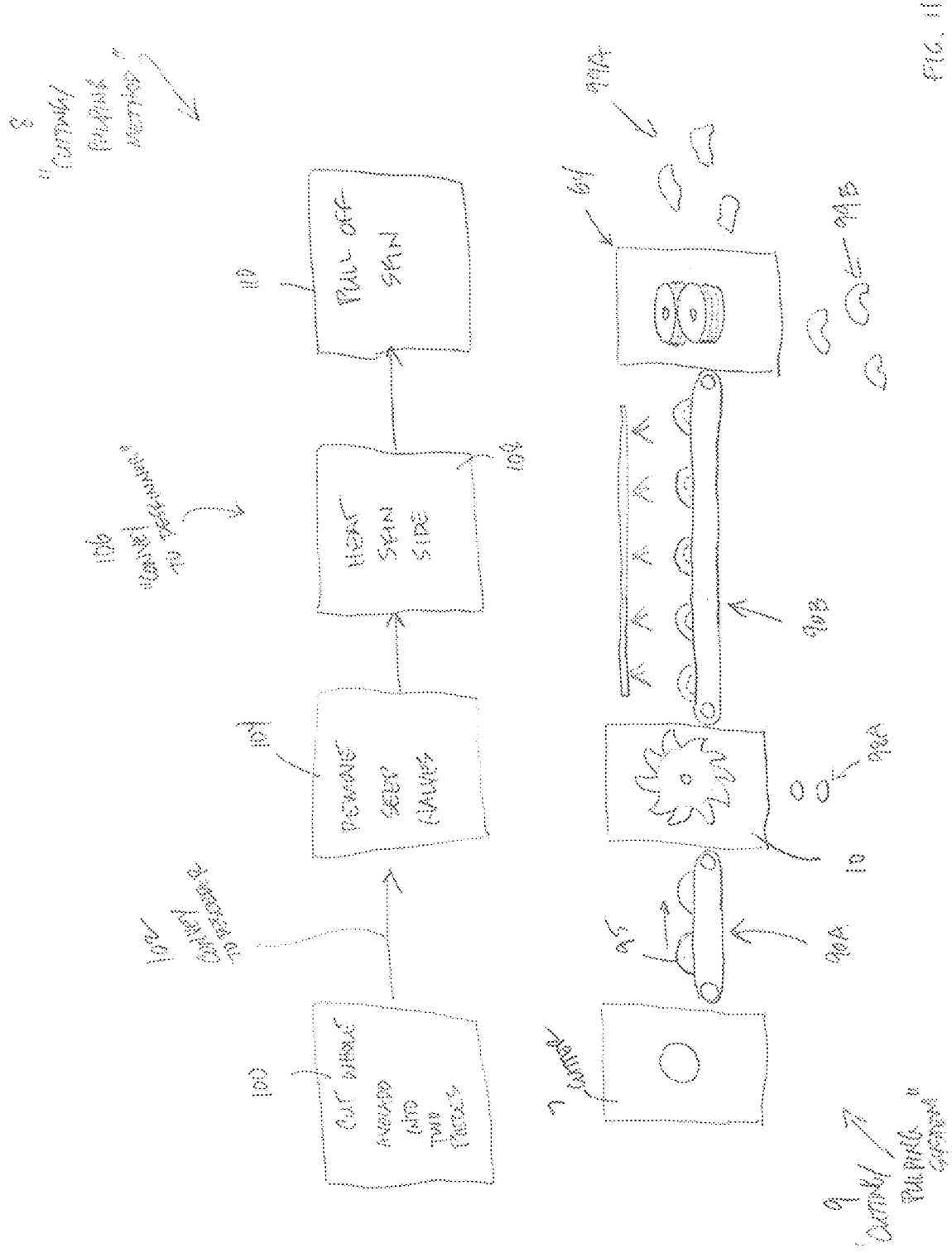
FIG. 11 depicts a block diagram and flowchart of the system and method of the present invention.

FIG. 10 is a perspective view of a preferred de-skinner 64 of the present invention. As the avocados reach the end of the conveyor 90B, they will be driven into the pair of knurled wheels 66 that are spinning in opposite directions so as to draw material towards them. This design is essentially the same as discussed in a prior patent to Richard Moore. The knurling of these wheels 66 are directional—they actually are canted to point towards the incoming fruit. This change from the prior designs results in the more firm grasp of the skin of the avocado. Since the surface layer of the avocado has been heated, the skin is more easily pulled off by the wheels 66, and the skins are ejected out of the back of the wheels 66, while the virtually whole piece of avocado pulp drops down onto a suitable capturing reservoir (or conveyor belt). FIG. 11 is provided to give an overview of the entire system and its operations.

FIG. 11 depicts a block diagram 9 and flowchart 8 of the system and method of the present invention. Moving from left to right using the block diagram, we can see that the first machine is the cutter 7. Next is the cutter-deseeder conveyor 90A, followed by the de-seeder 10. The deseeder-skinner conveyor 90B interconnects the de-seeder 10 and the skinner 64.

In operation, the avocado cutting and pulping method 8 begins with cutting whole avocados into two pieces 100. Next, the cut avocados 95 are conveyed to the de-seeder 102. The seed halves are removed 104 from the avocado halves 95, and the de-seeded halves are conveyed to the de-skinner 106. As they are being conveyed, the skin side of the avocados is heated 108 (such as by spraying hot water onto the fruit, or by other means). After the skin has been sufficiently heated, the skin 99A is pulled off of the pulp 110, and the pulp 99B is captured for preserving and packaging.

In an effort to provide the cleanest, most "chunky" and highest yield, an alternate de-skinner 164 was developed. This alternate design is depicted in FIGS. 12, 13 and 14.

Figure 12:
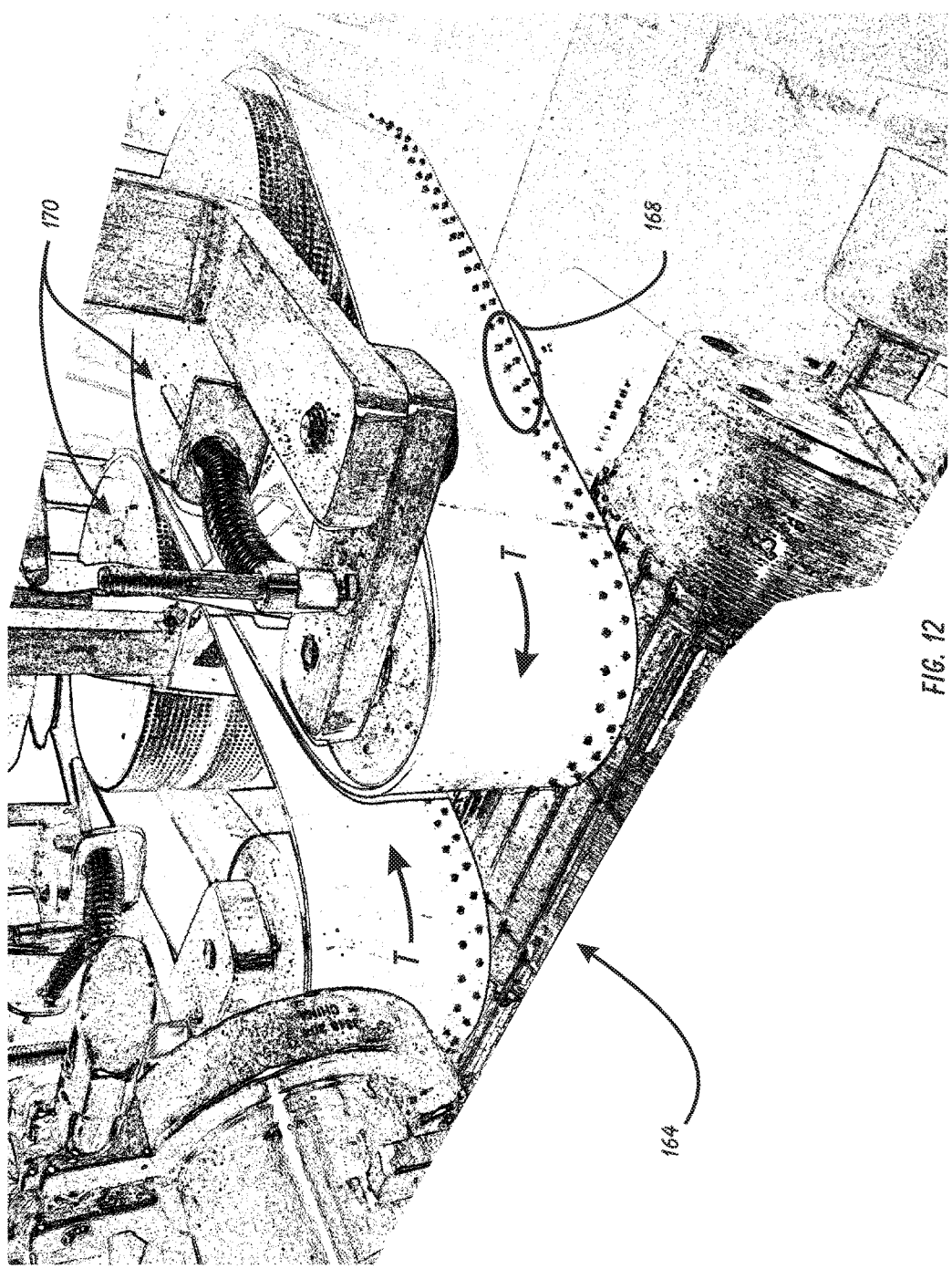
FIG. 12 is a perspective view of an alternate embodiment of the de-skinner of the present invention.
Figure 13:
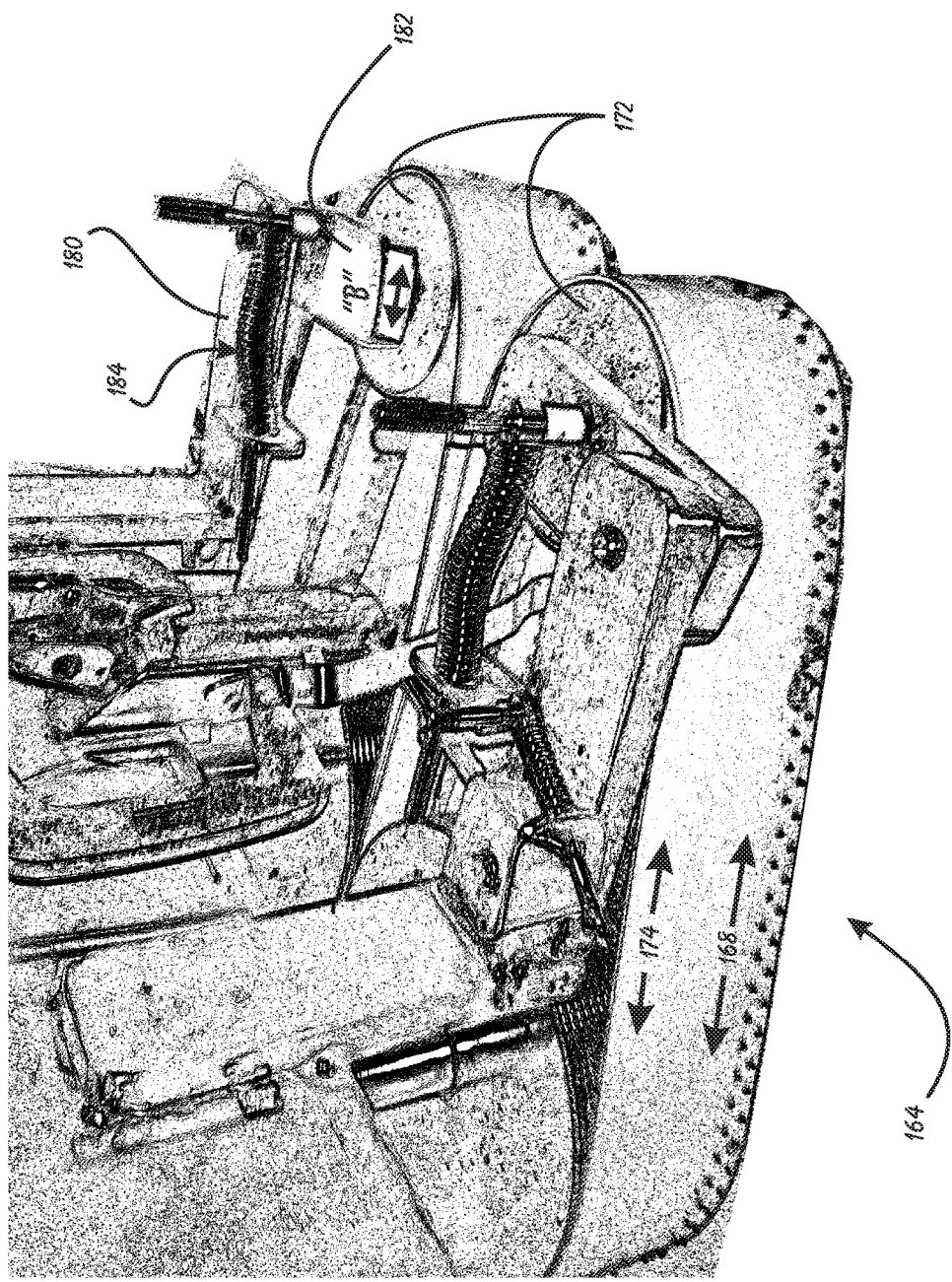
FIG. 13 is another perspective view of the de-skinner of FIG. 12.
Figure 14:
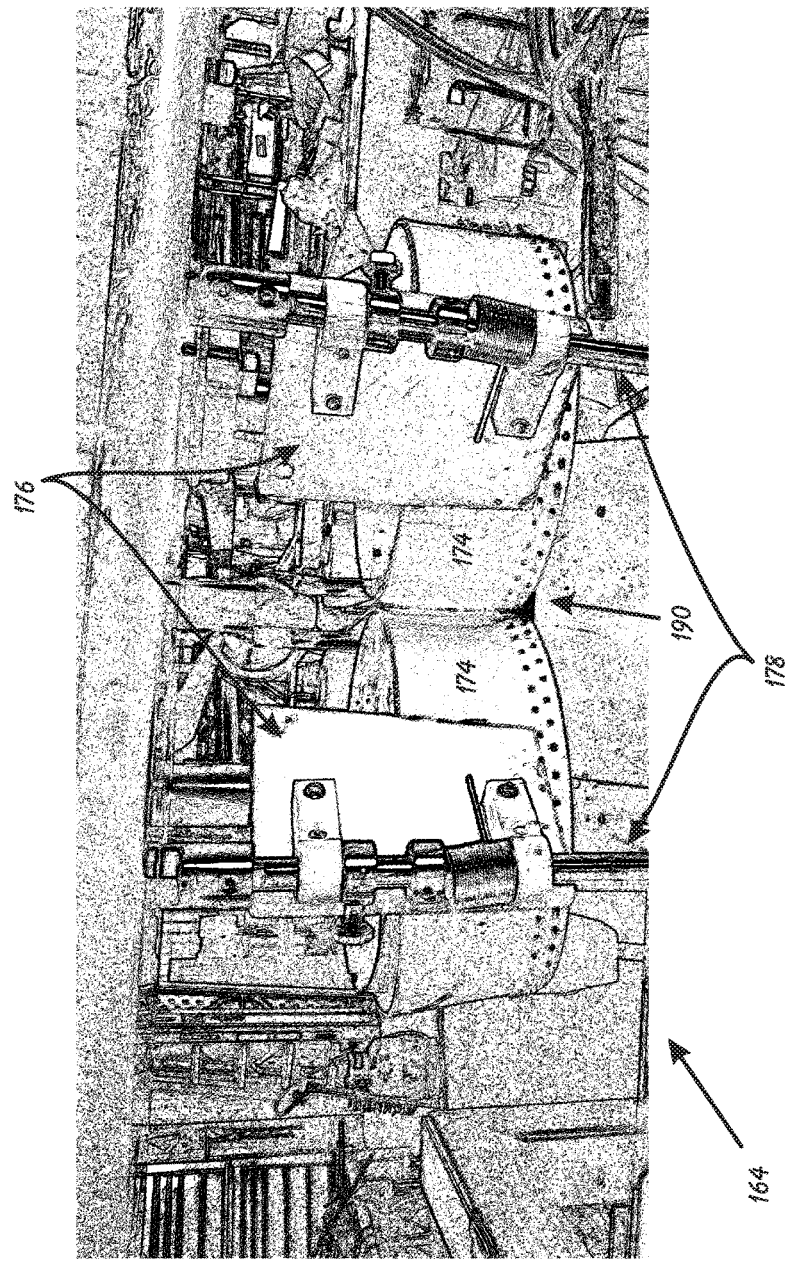
FIG. 14 is a back view of the de-skinner of FIGS. 12 and 13.

FIGS. 12 and 13 are a perspective view of the alternate embodiment of the de-skinner 164. The prior-described wheels [66] are utilized as drive wheels 170 for a pair of de-skinning belts 166 that rotate in direction "T." These belts 170 are very unique, in that they have two or more rows of studs 168 adjacent to the lower edge of the belts 166. These studs 168 have been formed from stainless steel nails ("brads") driven through the belts 166 from the backside, and then snipped off. This forms the rows of studs 168 having sharp, yet short protrusions from the face of the belts 166. The studs 168 have proven to be extremely effective grasping and removing the avocado skins as the fruit passes between the belts 166.

Idler wheels 172 (which also support the belts 166, but without driving them) are supported by a pinching biasing bracket 180 and a belt biasing bracket 182. The pinching biasing brackets 180 support the belt biasing brackets 182, and further exert biasing force in direction "P" (see FIG. 12), which tends to pinch against the fruit as it passes between the belts 166.

The belt biasing brackets 182 are biased in direction "B" by the biasing elements 184, which tends to create the tension on the belts 166. This can be adjusted depending upon fruit characteristics, as well as for maintenance (i.e. for belt removal).

FIG. 13 shows clearly that the upper portion of the belts 166 is smooth 174. The smooth portion 174 is simply a wider portion of the belt 166, provided to add stability to the belt 166. The portion having the stud rows 168 alone would not provide sufficient stability and durability.

Finally, we will turn to FIG. 14 to view the alternate de-skinner 164 from the back side. Each belt 166 has a scraper 176 riding along its smooth portion 174. These scrapers 176 are provided to continuously scrape off any residual avocado meat that happens to build up on the belts 166. The scrapers 176 each extend from scraper shafts 178. These shafts support the scrapers 176, and also bias them towards the surface of the belts 166.

As can also be seen here, the space 190 between the belts 166 at the rear of the de-seeder 164 is quite small. This is the case because the meat of the avocado halves actually drops out of the skin much further forward along the belts 166. Only the skin of the avocado will still be present at the exit of the belts 166.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for de-seeding and de-skinning fruit, comprising the steps of:
   cutting pieces of fruit into halves, with each said fruit half comprising a central seed-half, said seed-half partially surrounded by fruit meat, and said fruit meat partially surrounded by a skin;
   placing said fruit halves seed-side-down on a fruit-half conveyor;
   first conveying said fruit halves on said fruit-half conveyor to a de-seeder assembly, said de-seeder assembly comprising a pair of opposing rotating belts in relative spaced relation to form a feed channel, said feed channel defined by a feed channel gap;
   grasping said fruit halves from said fruit-half conveyor by said opposing belts;
   removing said seed-halves from said fruit halves by opposing belts carrying said grasped fruit halves over a de-seeder wheel;
   carrying said deseeded fruit halves to a skinner conveyor by said opposing belts;
   second conveying said de-seeded fruit halves on said skinner conveyor through a heating zone wherein the skin of said de-seeded fruit halves is heated;
   third conveying said de-seeded fruit halves having heated skin to a de-skinner assembly; and
   removing said heated skin from said fruit meat by passing said de-seeded fruit halves having heated skin through said de-skinner assembly.

2. The method of claim 1, wherein said de-seeder assembly of said first conveying step comprises:
   a pair of opposing belts, each said belt rotating on opposing wheels, one said wheel being an idler wheel and one said wheel being a drive wheel;
   said wheels for each belt rotatably attached to a lower frame;
   each said lower frame supported by a support frame to which each said lower frame slidingly engages; and
   a top plate supported by and slidingly engaging both said lower frames.

3. The method of claim 2, wherein said de-seeder assembly of said first conveying step comprises:
   two or more guide pegs extending upward from said support frames to engage slots formed in said lower frames and said top plate;
   to or more drive pegs extending downward from said top plate to engage slots formed in said lower frames; and
   whereby said feed channel gap width is adjusted by moving said top plate relative to said support frames along said guide pegs engagement with said said top plate slots.

4. The method of claim 3, wherein said de-seeder assembly of said first conveying step comprises a main frame from which said support frames extend; and
   a gap adjustment bolt extending between said main frame and an adjustment knob engaging said top plate, whereby rotating said adjustment knob causes said top plate to slide relative to said support frames, and said top plate sliding causes said lower frames to slide relative to said support frames, which causes the feed channel gap to widen or become narrower.

5. The method of claim 1, wherein said heating zone of said second conveying step comprises:
   a trough located beneath said skinner conveyor;
   a hot water dispensing manifold located above said skinner conveyor juxtaposed over said trough;
   a pump for pumping water to said hot water dispensing manifold through supply piping; and
   return piping for returning water from said trough to said pump.

6. The method of claim 5, wherein said heating zone of said second conveying step comprises a temperature-insulated said trough and a heating reservoir between said return piping and said pump for heating water to be pumped.

7. The method of claim 6, wherein said de-skinner assembly of said heated skin removing step comprises:
   a pair of rotating wheels in relative spaced relation located at a distal end of said skinner conveyor, each said rotating wheel defined by an abrasive peripheral face.

8. The method of claim 1, wherein said de-skinner assembly of said heated skin removing step comprises:
   a pair of rotating belts in relative spaced relation located at a distal end of said skinner conveyor, each said belt defined by an upper smooth portion and one or more rows of stud elements protruding from said belt, said one or more rows of stud elements located between said upper smooth portion and the lower edge defined by each said belt.

9. The method of claim 8, wherein said de-skinner assembly of said heated skin removing step comprises a scraper element positioned to contact said smooth portion of each said belt as said belts rotate.

10. A system for removing the seed and skin from an avocado, comprising:
    a cutter assembly for cutting whole avocados into halves and placing said avocados seed-side-down;
    a de-seeder assembly comprising opposing rotating belts in spaced relation to form a feed channel said feed channel defined by a feed channel gap, said feed channel gap width being adjustable so that it will grasp the avocado halves without damaging the avocado meat;
    a fruit-half conveyor configured to transport said avocado halves to said de-seeder assembly;
    a de-seeder wheel positioned under said feed channel whereby the seed halves will be pulled from said avocado halves by said de-seeder wheel as said avocado halves pass over said de-seeder wheel while being grasped by said opposing rotating belts;

a de-skinner assembly comprising a pair of opposing rotating belts or wheels defined by an abrasive surface; and a heating conveyor configured to transport said de-seeded avocado halves from said de-seeder assembly to said de-skinner assembly while also heating the skin of the de-seeded avocado halves.

11. The system of claim 10, wherein said de-seeder assembly comprises:

a pair of opposing belts, each said belt rotating on opposing wheels, one said wheel being an idler wheel and one said wheel being a drive wheel;

said wheels for each belt rotatably attached to a lower frame;

each said lower frame supported by a support frame to which each said lower frame slidingly engages; and a top plate supported by and slidingly engaging both said lower frames.

12. The system of claim 11, wherein said de-seeder assembly comprises:

two or more guide pegs extending upward from said support frames to engage slots formed in said lower frames and said top plate;

to or more drive pegs extending downward from said top plate to engage slots formed in said lower frames; and whereby said feed channel gap width is adjusted by moving said top plate relative to said support frames along said guide pegs engagement with said said top plate slots.

13. The system of claim 12, wherein said de-seeder assembly comprises a main frame from which said support frames extend; and a gap adjustment bolt extending between said main frame and an adjustment knob engaging said top plate, whereby rotating said adjustment knob causes said top plate to slide relative to said support frames, and said top plate sliding causes said lower frames to slide relative to said support frames, which causes the feed channel gap to widen or become narrower.

14. The system of claim 11, further comprising:

a skinner conveyor interconnecting said de-seeder assembly and said de-skinner assembly;

a trough located beneath said skinner conveyor;

a hot water dispensing manifold located above said skinner conveyor juxtaposed over said trough, said hot water dispensing manifold defined by a plurality of nozzles for directing water onto avocados on said skinner conveyor;

a pump for pumping water to said hot water dispensing manifold through supply piping; and return piping for returning water from said trough to said pump.

15. The system of claim 14, further comprising a temperature-insulated said trough and a heating reservoir between said return piping and said pump for heating water to be pumped.

16. The system of claim 10, wherein said de-skinner assembly comprises:

a pair of rotating wheels in relative spaced relation located at a distal end of said skinner conveyor, each said rotating wheel defined by an abrasive peripheral face.

17. The system of claim 10, wherein said de-skinner assembly comprises:

a pair of rotating belts in relative spaced relation located at a distal end of said skinner conveyor, each said belt defined by an upper smooth portion and one or more rows of stud elements protruding from said belt, said one or more rows of stud elements located between said upper smooth portion and the lower edge defined by each said belt.

18. The system of claim 17, wherein said de-skinner assembly comprises a scraper element positioned to contact said smooth portion of each said belt as said belts rotate.

* * * * *